UNITED STATES PATENT OFFICE.

JOHN JOHNSON, OF SACO, MAINE.

IMPROVEMENT IN MODES OF OBTAINING HEAT.

Specification forming part of Letters Patent No. 76,463, dated April 7, 1868.

*To all whom it may concern:*

Be it known that I, JOHN JOHNSON, of the city of Saco, in the county of York, in the State of Maine, have invented a new and Improved Mode of Obtaining and Transmitting Heat; and I do hereby declare that the following is a full and exact description thereof.

The nature of my invention consists in the employment of, and inclosing within an airtight space, a small quantity of solid or liquid capable, by heat, of being converted to vapor, and thereby to occupy a greatly enlarged space over that occupied by the solid or liquid for the purpose of transferring heat of vapor, or latent and sensible heat, to other bodies or substances, the elimination of which returns the inclosed material to its normal condition for repetition as often as found necessary or continuously.

For very low temperatures, I employ such of the ethers as are found most suitable for the temperature required to be obtained. A higher temperature may be obtained from alcohol. Water affords the most desirable temperature when I employ it as a heating medium to air in chambers of some magnitude, the small amount of water therein being converted to steam.

Higher temperatures can be readily obtained by the employment of salt solutions and oleaginous liquids and solids, without increase of tension, within the case the vapors are formed in. The boiling-point of these bodies being high, the vapors from them will greatly increase the sensible temperature over that of steam of the same tension when filling a tight chamber with their vapors.

When I employ my process for the purpose of obtaining a higher temperature than 212° Fahrenheit by the use of vaporizable liquids, I first decide upon the form and size of the apparatus. If it be for cooking, I put it into the desirable shape—that is, I take a steam-pipe of, say, one-half inch internal diameter, and form it into a suitable coil, one section to become the boiler, the other the transmitter of heat. If the length be such as that the pipe be equal to one cubic foot of space, and I need a temperature of, say, about 250° Fahrenheit, I put into this tube about two cubic inches of water. I next place the boiler over a proper heat and convert thereby some of the water to steam.

As soon as the steam is formed the contained air will be driven from the tube. I then immediately effectually hermetically seal up this aperture, and the apparatus is ready for use as a broiler or boiler. Had the temperature needed been greater, more water inclosed would have produced it.

To convert the foregoing to a frying-pan or baker, I affix or cast upon the transmitting end a suitably-formed dish, to which the heat is transmitted, and into which the articles to be cooked are placed. Proper covers, to act as reflectors and protectors, complete the apparatus.

The process is equally applicable to many of the arts. For evaporating or concentrating, I construct double kettles, first placing between the two that material which shall furnish, upon being converted to vapor, the required amount of heat or temperature and tension. I then make the space between the two air-tight, first providing for the escape of the inclosed air, as before set forth. By placing a fire beneath the lower kettle, in a very short time the inclosed material will be converted to vapor. The latent heat of this vapor is transmitted to the inner kettle and to its contents, thereby heating, boiling, and evaporating its contained material, without in the least degree endangering or injuring the product from overheating. As the latent heat is carried away, condensation takes place between the kettles, liquid is formed, and, gravitating to the bottom, is there again converted to vapor for further useful work.

In evaporating by my system, ebullition goes on quietly and regularly, bumping being entirely avoided, boiling taking place some distance from the bottom of the kettle.

It will be obvious that my process can be applied to the generation of steam and to the superheating of it.

The process herein described differs from any and all others hitherto known or used, from the fact that I employ a small quantity of vaporizable material to a large chamber or space, and being made air, steam, and vapor tight, no waste of contained material can take place, the latent heat, or heat of vapor, doing the work, thereby avoiding tension when the internal surface be or any considerable area. At same time, when the apparatus is not in use frost cannot injure the apparatus, though the water or other contained material be congealed. This system will very much tend to extend the use of steam and vapor as a heat-affording means, by greatly lessening first cost of apparatus and largely dispensing with the usual pipes, fittings, valves, gages, water, and other supplies to boilers, thereby avoiding waste, leaks, and annoyances, and rendering accidents remotely contingent, if not impossible.

It will also be apparent that this process is well fitted to the boiling of oils, melting of gums for varnish-making, and for many uses in the arts and trades where the direct application of fire would be inconvenient and dangerous to both person and property.

Liquids and solids are now employed as vehicles for transmitting heat: water, as the well-known hot-water circulating system of low tension or head, the reservoir of water always being open to atmospheric pressure; the sealed system, known as that of Angier March Perkins. Heat is carried by both by the difference of gravity of the ascending and descending columns.

I have employed mercury, others oils and oleaginous and other bodies, as transmitters of heat on the principles of movement due to levity.

Steam, known as high and low pressure, and that from the exhaust-port of a steam-engine, is very extensively employed to supply heat to a multitude of uses and applications. In our dwellings, also, to some extent, steam-heat is substituting that of heated air.

It will be obvious that from the simplicity, efficiency, economy, and safety of my system, as herein set forth, a much greater range of application to steam and vapor heating can now prevail in our dwellings and manufactories, &c., than heretofore.

What I claim, and desire to secure by Letters Patent, is—

The application and use of a small but proper quantity of any liquid or solid, when inclosed within an air-tight case or form, for the purpose of receiving heat sufficient to convert it to steam or vapor, and in this state to act as a conveyer and transmitter of heat to other bodies for needed change, and by which transference the agent shall re-form to liquid, to be again and again converted to vapor, carrying with it latent heat for transmission.

JOHN JOHNSON. [L. S.]

Witnesses:
   WM. H. WARNE,
   GEO. T. REED.